(12) United States Patent
Purucker et al.

(10) Patent No.: US 11,299,808 B2
(45) Date of Patent: Apr. 12, 2022

(54) ELECTROLYSIS UNIT AND METHOD FOR OPERATING THE ELECTROLYSIS UNIT

(71) Applicant: Siemens Energy Global GmbH & Co. KG, Bayern (DE)

(72) Inventors: Thomas Purucker, Hessdorf (DE); Stephan Rückert, Erlangen (DE); Jochen Straub, Erlangen (DE); Peter Utz, Nuremberg (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 17/259,610

(22) PCT Filed: Jul. 8, 2019

(86) PCT No.: PCT/EP2019/068209
§ 371 (c)(1),
(2) Date: Jan. 12, 2021

(87) PCT Pub. No.: WO2020/020611
PCT Pub. Date: Jan. 30, 2020

(65) Prior Publication Data
US 2021/0292919 A1     Sep. 23, 2021

(30) Foreign Application Priority Data
Jul. 27, 2018 (EP) .................................. 18186039

(51) Int. Cl.
*C25B 1/04* (2021.01)
*C25B 15/08* (2006.01)
(Continued)

(52) U.S. Cl.
CPC .................. *C25B 1/04* (2013.01); *C25B 9/05* (2021.01); *C25B 9/23* (2021.01); *C25B 9/70* (2021.01);
(Continued)

(58) Field of Classification Search
CPC ......... C25B 1/04; C25B 15/083; C25B 15/08; C25B 9/70; C25B 9/23; C25B 9/05
See application file for complete search history.

(56) References Cited

U.S. PATENT DOCUMENTS 1,702,924 A * 2/1929 Allan ....................... C25B 9/19
204/239
8,936,712 B2 * 1/2015 Kurashina ................ C25B 9/05
205/628
(Continued)

FOREIGN PATENT DOCUMENTS

| DE | 10258525 A1 | 7/2004 |
|---|---|---|
| JP | H10251884 A | 9/1998 |
| JP | 3366549 B2 | 1/2003 |

OTHER PUBLICATIONS

Database WPI Week 199848 Thomson Scientific, London, GB; AN 1998-563666 XP002788255, & JP H10 251884 A (Shinko Pantec Co Ltd;—& JP 3 366549 B2 (Shinko Pantec Co Ltd); Jan. 14, 2003 (Jan. 14, 2003), Abstract; Figure 1; 1998.
(Continued)

*Primary Examiner* — Brian W Cohen
(74) *Attorney, Agent, or Firm* — Wolter Van Dyke Davis, PLLC

(57) ABSTRACT

An electrolysis unit and to a method for electrochemically decomposing water into hydrogen and oxygen. The electrolysis unit has at least two electrolysis modules. The electrolysis unit also has exactly one first gas separation device for a first product gas including oxygen and exactly one second gas separation device for a second product gas including hydrogen. The first gas separation device is connected to the at least two electrolysis modules by respective first lines. The second gas separation device is connected to the at least two electrolysis modules by respective second lines. The at least two first lines have the same first length. The at least two second lines likewise have the same second length.

18 Claims, 4 Drawing Sheets

(51) Int. Cl.
    *C25B 9/70* (2021.01)
    *C25B 9/23* (2021.01)
    *C25B 9/05* (2021.01)
    *C25B 13/00* (2006.01)

(52) U.S. Cl.
    CPC ............ *C25B 13/00* (2013.01); *C25B 15/081* (2021.01); *C25B 15/083* (2021.01)

(56) References Cited

U.S. PATENT DOCUMENTS

| | | |
|---|---|---|
| 2006/0049039 A1 | 3/2006 | Brand |
| 2012/0058405 A1* | 3/2012 | Kirchoff ................. C25B 11/02 |
| | | 429/422 |
| 2012/0186991 A1* | 7/2012 | Gootblatt ................. C25B 1/04 |
| | | 205/628 |
| 2016/0060776 A1 | 3/2016 | Kawajiri |
| 2016/0194769 A1* | 7/2016 | Arai ........................ C25B 15/08 |
| | | 205/351 |

OTHER PUBLICATIONS

PCT International Search Report and Written Opinion of International Searching Authority dated Jul. 10, 2019 corresponding to PCT International Application No. PCT/EP2019/068209 filed Aug. 7, 2019.

* cited by examiner

ELECTROLYSIS UNIT AND METHOD FOR OPERATING THE ELECTROLYSIS UNIT

CROSS REFERENCE TO RELATED APPLICATIONS

This application is the US National Stage of International Application No. PCT/EP2019/068209 filed Jul. 8, 2019, and claims the benefit thereof. The International Application claims the benefit of European Application No. EP18186039 filed Jul. 27, 2018. All of the applications are incorporated by reference herein in their entirety.

FIELD OF INVENTION

The invention relates to an electrolysis unit having at least one electrolysis cell and a method for operating the electrolysis cell.

BACKGROUND OF INVENTION

An electrolyzer is an apparatus by means of which electric current brings about a transformation of material (electrolysis). Corresponding to the variety of different electrolyses, there is also a large number of electrolyzers, for example an electrolyzer for hydrogen electrolysis.

Present-day considerations are directed to producing materials of value using surplus energy from renewable energy sources in times when there is a great amount of sun and a great amount of wind, i.e. when there is above-average generation of solar power or wind power. A material of value can be, in particular, hydrogen which is produced by means of hydrogen electrolyzers. EE gas, for example, can be produced by means of the hydrogen.

A (hydrogen electrolysis) electrolyzer firstly produces hydrogen by means of electric energy, in particular from wind energy or solar energy. The hydrogen is then used together with carbon dioxide in a Sabatier process to produce methane. The methane can then, for example, be fed into an existing natural gas network and thus allow storage and transport of energy to the consumer and can thus relieve the load on an electricity grid. As an alternative, the hydrogen produced by the electrolyzer can also be used further directly, for example, for a fuel cell.

In an electrolyzer for hydrogen electrolysis, water is broken down into hydrogen and oxygen. In the case of a PEM electrolyzer, distilled water is typically fed in as starting material on the anode side and dissociated into hydrogen and oxygen at a proton-permeable membrane ("proton exchange membrane"; PEM). The water is at the same time oxidized to oxygen at the anode. The protons pass through the proton-permeable membrane. On the cathode side, hydrogen is produced.

The water should be conveyed at a constant rate into the anode space and/or cathode space in order to ensure uniform distribution of the water in these spaces and thus also effective electrolytic dissociation of the water. Transport is typically effected by means of pumps. As an alternative or in addition, the distribution of the water in the spaces can also occur by means of natural convection. In the principle of natural convection, the electrolyzer and the gas separators are arranged at different heights. The gas separators are located above the electrolyzer. The liquid water is introduced into the electrolyzer at the bottom and subsequently dissociated into the product gases in the electrolyzer. The ascending product gas rises as a result of the density differences into the gas separators where unreacted water is separated from the product gas. The water now flows back into the electrolyzer because of its higher density. This natural convection can be assisted if required by pumps.

An electrolysis unit typically comprises at least four electrolysis modules. An electrolysis module typically comprises 50 electrolysis cells. At present, one gas separator for the product gas hydrogen and one gas separator for the product gas oxygen are required for two electrolysis modules. Thus, the construction of the electrolysis unit with natural convection quickly becomes disadvantageously elaborate and complex in terms of construction. Furthermore, operation is disadvantageously associated with increased complexity of safety monitoring and maintenance.

SUMMARY OF INVENTION

It is therefore an object of the invention to provide an electrolysis unit and a method for operating an electrolysis unit, in particular with natural convection, which offer simplified and nevertheless safe operation of the electrolysis.

The object is achieved by an electrolysis unit as claimed and a method for operating the electrolysis unit as claimed.

The electrolysis unit of the invention for the electrochemical dissociation of water into hydrogen and oxygen comprises at least two electrolysis modules. It further comprises exactly one first gas separation device for a first product gas comprising oxygen. It also comprises exactly one second gas separation device for a second product gas comprising hydrogen. The first gas separation device is connected to each of the at least two electrolysis modules by means of a first conduit in each case and the second gas separation device is connected to each of the electrolysis modules by means of a second conduit in each case. Here, the at least two first conduits have the same first length and the at least two second conduits have the same second length.

The method of the invention for operating an electrolysis unit comprises the following steps. Firstly, an electrolysis unit having at least two electrolysis modules is provided, with water being dissociated into hydrogen and oxygen in the electrolysis module. Furthermore, a first gas separation device for a first product gas comprising oxygen is provided. A second gas separation device for a second product gas comprising hydrogen is also provided. Here, the first gas separation device is connected to each of the at least two electrolysis modules by means of a first conduit in each case. The second gas separation device is connected to each of the at least two electrolysis modules by means of a second conduit in each case. Here, the at least two first conduits have the same first length and the at least two second conduits have the same second length.

As a result of the first length of the first conduits between the first gas separation device and the electrolysis modules being the same and the second length of the second conduits between the second gas separation device and electrolysis modules also being the same the structure of the electrolysis unit is simplified. The identical nature of the parts likewise allows simple repairs or simple replacement of the conduits.

Furthermore, when three or more electrolysis modules are used, only one gas separation device is required per product gas, thus a total of two gas separation devices, which constitutes an advantage. This considerably simplifies the structure of the electrolysis unit.

Furthermore, the fill levels in the gas separation devices are constant during the entire period of operation since there are only these two gas separation devices and these are constantly connected to the electrolysis modules by the conduits having the same length. The maintenance of the constant fill levels increases the safety of the electrolysis since empty running of the gas separators and an associated mixing of the product gases hydrogen and oxygen is prevented.

In an advantageous embodiment and further development of the invention, an electrolysis module comprises at least two electrolysis cells, in particular 50 electrolysis cells, and each electrolysis cell has an anode space having an anode and a cathode space having a cathode. Here, the anode space is separated from the cathode space by means of a proton exchange membrane. The anode space is suitable for accommodating water and oxidizing it at the anode to give a first product comprising oxygen. The cathode space is suitable for accommodating water and reducing at the cathode to give a second product comprising hydrogen. The dissociation of the water advantageously occurs directly from deionized water by means of a proton exchange membrane.

In a further advantageous embodiment and further development of the invention, the cathode space is connected to the second gas separation device and the anode space is connected to the first gas separation device. The spaces in which the product gases are formed are thus advantageously connected directly to the gas separation devices. This advantageously simplifies the structure since no additional conduits are necessary.

In a further advantageous embodiment and further development of the invention, the first gas separation device and the second gas separation device are arranged inside one another. Here, the first or second gas separation device is configured as an outer shell and a bottom and the other second or first gas separation device is configured as a tube which projects into the shell. In other words, this means that one of the two gas separation devices is configured as a vessel having the outer shell and the bottom. The other of the two gas separation devices is configured as a tube which projects into this vessel. In other words, this means that the interior tube forms one of the gas separation devices and the outer vessel forms an intermediate space with the interior tube, which intermediate space forms the other of the gas separation devices. There is thus an outer gas separation device whose circumference is greater than the circumference of the other gas separation device, with the gas separation devices being arranged inside one another. It is possible for either hydrogen or oxygen to be separated off in the inner gas separation device.

For safe operation of this embodiment, the level of the water in the gas separation devices has to project into the interior tube. Only in this way is it ensured that the two gas spaces, which comprise hydrogen or oxygen, are kept separate from one another. In other words, the water serves as syphon-like lock in order to separate the two sides from one another.

It is thus advantageously possible to arrange the two gas separation devices inside one another, which saves space. Furthermore, the two gas separation devices are arranged between the electrolysis modules in such a way that the first length of the first conduit and the second length of the second conduit are the same. This ensures that the fill height in the integrated gas separation devices remains virtually constant since the pressure drop in the conduits is approximately equal. The materials parameters and the flows of materials formed also remain virtually constant. Efficient and safe operation of the plant is thus possible.

In a further advantageous embodiment and further development of the invention, the tube which surrounds the interior gas separation device has a closing face in the direction of the bottom, wherein the closing face is configured as a grid, as a perforated plate or as a mesh. This embodiment of the closing face advantageously makes it possible to influence the flow between the first gas separation device and the second gas separation device. Furthermore, the use of the closing face advantageously stabilizes a cross section of the tube.

In a further advantageous embodiment and further development of the invention, a cross section of the shell and/or a cross section of the tube is round or a polygon. The number of corners particularly advantageously corresponds to the number of electrolysis modules. An odd number of electrolysis modules can also be particularly advantageously connected to the gas separation devices. In other words, the number of electrolysis modules which are connected to a gas separation device can be chosen freely.

In a further advantageous embodiment and further development of the invention, the first gas separation device is connected to a first pressure maintenance device and the second gas separation device is connected to a second pressure maintenance device.

The pressure maintenance facility can advantageously be arranged on the hydrogen and/or oxygen side of the position to be secured and does not have to be accommodated in an adjoining conduit. The pressure maintenance device ensures, in particular, that the oxygen formed and the hydrogen formed can be taken off at a constant rate from the gas separators, so that the level of the water which separates the two gas spaces from one another is reliably maintained. The pressure maintenance devices thus advantageously ensure direct checking of the safety of the plant, as a result of which measures can already be undertaken at an early point in time when the pressure changes so as to be able to operate the plant safety.

In particular, the gas space in the gas separation devices can be arranged with its lower boundary above the inlet of the conduits from the gas separation devices into the electrolysis module, in particular the water inlet, in order to ensure that only water is fed into the modules and no oxygen or hydrogen flows back through conduits into the electrolysis modules. In other words, this means that the gas spaces comprising hydrogen or oxygen should be reliably separated from one another in order to avoid mixing of the two gases.

In a further advantageous embodiment and further development of the invention, at least one pump is arranged between the first gas separation device and/or the second gas separation device and the electrolysis modules. This pump can serve to assist or increase natural convection. In particular, it is advantageously used when the pressure in the electrolysis modules is in the range from 1 bar to 5 bar.

It is conceivable for only exactly one pump to be arranged between the gas separation devices and the electrolysis modules when the gas separation devices are connected to one another by means of a ring conduit and exactly one pump is arranged in the ring conduit.

As an alternative, it is conceivable for a pump to be used both for the oxygen side and for the hydrogen side of each module, i.e. two pumps are present per module. These pumps assist natural convection. It is likewise conceivable for only exactly one pump to be present for the hydrogen side and the oxygen side, i.e. one pump is present per module.

In a further advantageous embodiment and further development of the invention, the electrolysis unit comprises at least three electrolysis modules, with the electrolysis modules being arranged in a circle and the first and second gas separation devices being arranged centrally in the middle between the modules.

The conduits which connect the gas separation device to the electrolysis modules thus advantageously have the same length. This identical nature of the parts simplifies the structure of the plant. The complexity is thus advantageously reduced, as a result of which the costs of the plant become lower.

Furthermore, the identical nature of the conduit lengths results in all modules having the same pressure conditions on the respective gas side, i.e. the oxygen side or the hydrogen side. The electrolysis modules thus behave in the same way, which firstly leads to constant safety and secondly allows good regulatability of the electrolysis modules among one another. The same pressure conditions on the water side, too, advantageously result in uniform supply with water and thus an at least very similar temperature of the individual modules when the modules have a like construction.

In a further advantageous embodiment and further development of the invention, the first or second gas separation device is connected to exactly one heat exchanger for cooling the water which has been separated off.

The circulation pump for the process water and the recooling of the process water for the individual electrolysis modules can advantageously be separated from one another. Only a central heat exchanger is then required. Furthermore, it is no longer necessary to make the heat exchanger larger than necessary in order to obtain a small differential pressure. The type of heat exchanger, in other words the type of cooling, can be chosen freely. In particular, systems using air or water as heat transfer medium can be employed. However, it is also possible to use a water/glycol mixture as heat transfer medium in the heat exchanger. The selection of the type of cooling is carried out as a function of site conditions.

Owing to the thermal mass of the water in the gas separation devices which are arranged centrally between the electrolysis modules, temperature regulation for the process temperature can advantageously be simplified. The number of valves in the cooling circuit can be reduced, which advantageously decreases the costs. Advantageously, only one process control unit for regulating the temperature per heat exchanger is sufficient.

In a further advantageous embodiment and further development of the invention, the electrolysis unit comprises exactly one water treatment device which is connected to the first or second gas separation device. In other words, this means that the water treatment device can also operate centrally. In particular, the process water can be conveyed through the heat exchanger and the water treatment device using the same pump. This advantageously simplifies the structure of the electrolysis unit, as a result of which costs are reduced and maintenance requirements for the electrolysis unit decrease. When using one pump for the water treatment device and the heat exchanger, the temperature for the water treatment can particularly advantageously be selected so as to be so low that it is possible to use mixed bed ion exchangers which can effect separation at these low temperatures. Typical mixed bed maximum temperatures are about 60° C.

In a further advantageous embodiment and further development of the invention, the electrolysis module comprises a module end plate, which has an exterior covering surface, on each of two opposite sides. Here, a first electrolysis module is electrically connected to a second electrolysis module in such a way that a contacting device contacts a covering surface of the first electrolysis module and a covering surface of the second electrolysis module.

If at least three electrolysis modules are connected to one another, the contacting devices can particularly be arranged alternately on opposite sides. This means that the electrolysis modules are partly covered virtually completely by the contacting device on both covering surfaces.

This advantageously allows full-area contacting of the modules by means of the module end plates. This makes uniform, equal current distribution over the electrolysis module possible. A uniform loading of the electrode unit with the membrane advantageously increases the life of the electrolysis module and thus also the life of the electrolysis unit.

BRIEF DESCRIPTION OF THE DRAWINGS

Further features, properties and advantages of the present invention may be derived from the following description with reference to the accompanying figures. The figures schematically show.

DETAILED DESCRIPTION OF INVENTION

Figure 1:
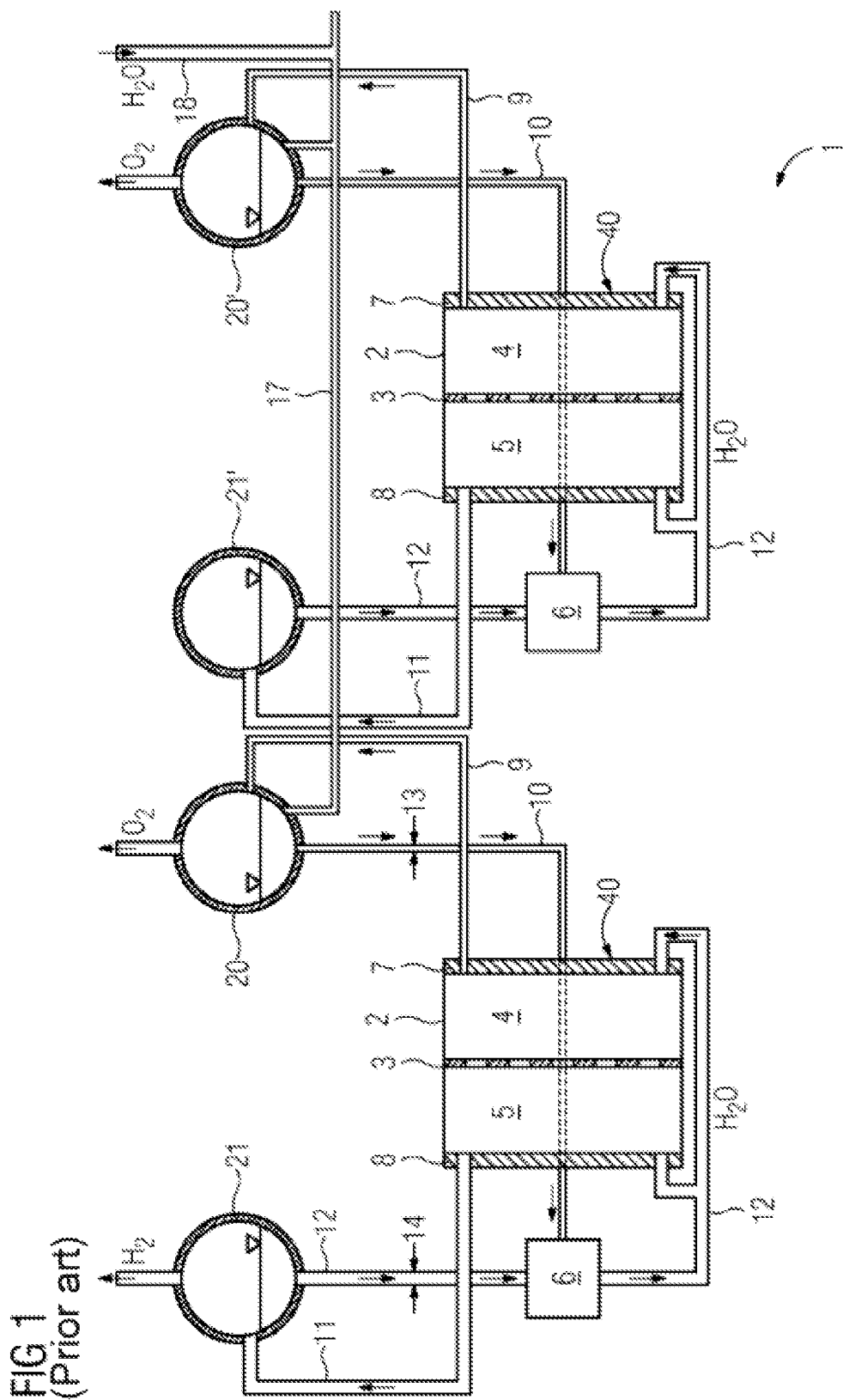
FIG. 1 an electrolysis unit according to the prior art comprising two electrolysis cells and first gas separation devices connected to one another.

FIG. 1 shows an electrolysis unit 1 from the prior art having two electrolysis modules 40, with an electrolysis module comprising a plurality of electrolysis cells 2, in particular fifty electrolysis cells. Each of the electrolysis modules 40 has an oxygen-side first gas separation device 20 (20') and a hydrogen-side second gas separation device 21 (21'). The recirculation of the water is configured in such a way that the back-flowing water streams mix in the heat exchanger and are subsequently conveyed back to the oxygen side in the electrolysis cell. The oxygen-side gas separation devices 20 (20') are connected to one another via a syphon-like fifth conduit 17. Furthermore, the fifth conduit 17 comprises a feed device 18 for fresh water. This example from the prior art involves single-side circulation operation on the oxygen side.

The connection of a plurality of electrolysis cells via the syphon-like fifth conduit 17 ensures resupply of water, which avoids dropping of the liquid level in the gas separation devices 20, 21. In the prior art, all gas separation devices of the same type, in each case those of the oxygen side and hydrogen side, are thus connected to one another by means of a syphon-like conduit in order to keep the levels in the gas separation devices constant among one another and thus ensure safety.

Figure 2:
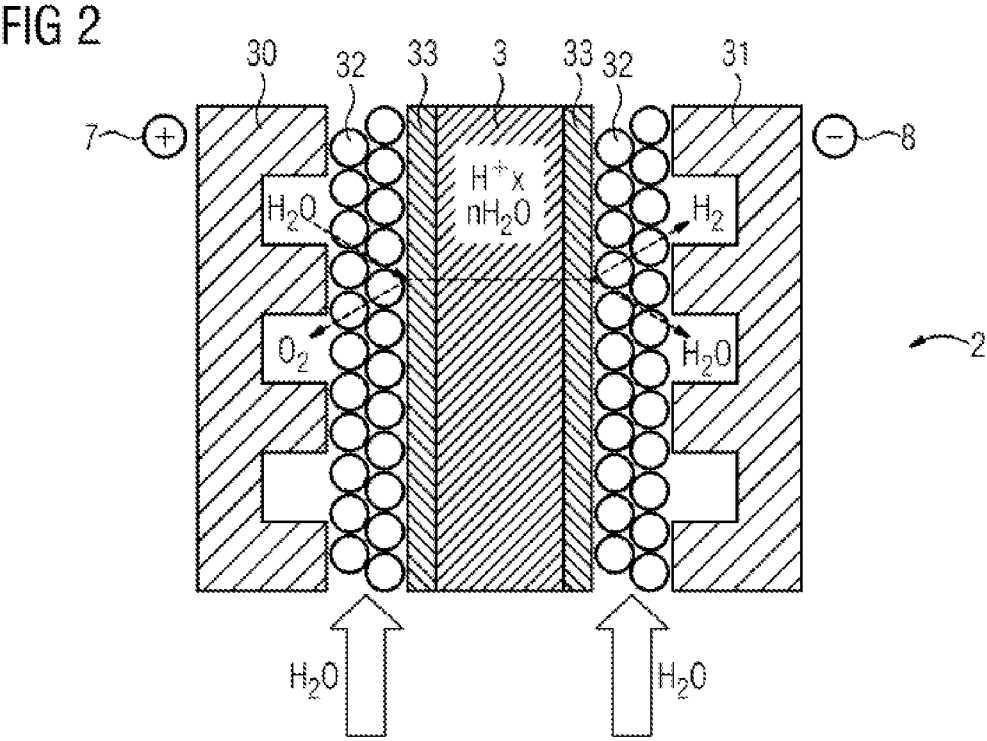
FIG. 2 an electrolysis cell with proton exchange membrane.

FIG. 2 shows an electrolysis cell 2 having a proton exchange membrane 3. The electrolysis cell 2 comprises an anode 7 and a cathode 8. The two electrodes 7, 8 are adjoined in each case by bipolar plates 30, 31. The bipolar plates each adjoin a porous support structure 32. The starting material water flows through this support structure 32 in the electrolysis cell 2. The porous support structure 32 in turn adjoins an electrocatalytic layer 33. An electrocatalytic layer 33 is arranged in the anode space 4, and an electrocatalytic layer 33 is arranged in the cathode space 5. The electrocatalytic layer 33 of the anode side typically comprises iridium, while the electrocatalytic layer 33 of the cathode side typically comprises platinum. The proton exchange membrane PEM 3 is located between these two catalytic layers 33. This PEM comprises, in particular, a sulfonated fluoropolymer, particularly comprising perfluorosulfonic acid. An advantage of the PEM electrolysis cell 2 is that pure water can be used as starting material. Thus, no alkali or other liquid components are used as carrier components for the water.

Figure 3:
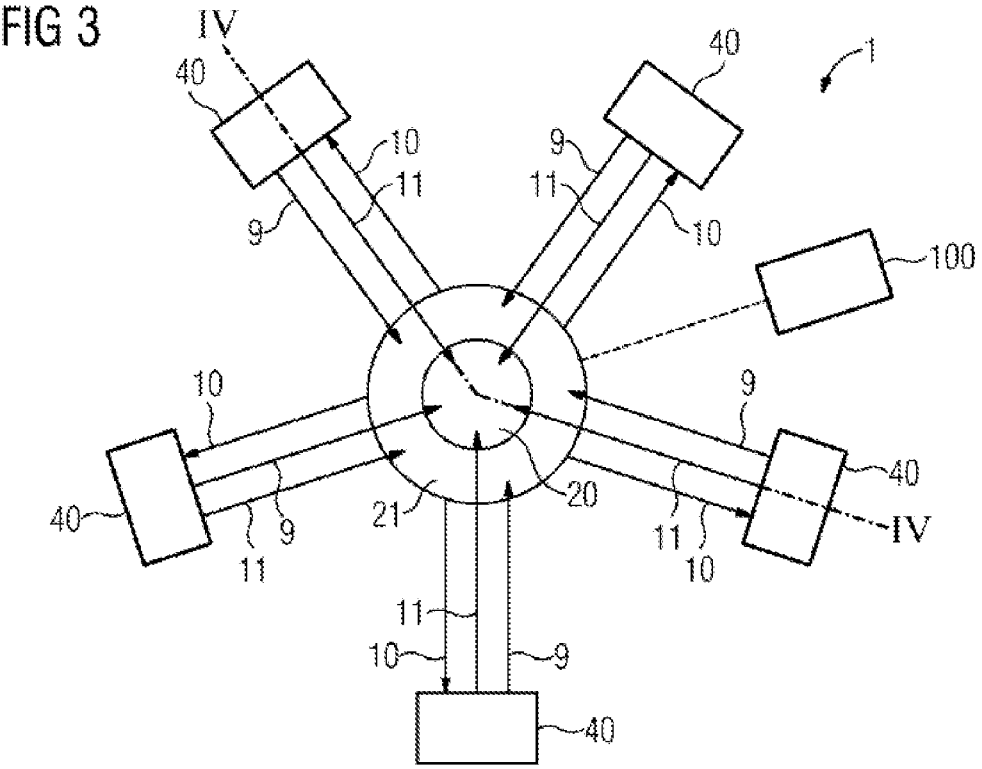
FIG. 3 a plan view of an electrolysis unit having five electrolysis modules and a central gas separation device.

FIG. 3 shows an electrolysis unit 1 having five electrolysis modules 40. Each electrolysis module 40 typically comprises 50 electrolysis cells as depicted in FIG. 2. A central gas separation device is arranged in the middle between the electrolysis modules 40. The central gas separation device comprises a first gas separation device 20 for separating off oxygen. The central gas separation device further comprises a second gas separation device 21 for separating off hydrogen. The first gas separation device 20 is arranged within the second gas separation device 21.

The electrolysis modules 40 are each connected via a first conduit 9 to the second gas separation device 21. The first conduit 9 is advantageously connected to the cathode space in which the hydrogen is formed. A mixture of water and hydrogen is conveyed through the first conduit 9. This mixture is subsequently separated in the second gas separation device 21. The electrolysis modules 40 are each additionally connected via a third conduit 11 to the first gas separation device 20. Accordingly, a mixture of water and oxygen is transported through the third conduit 11. Advantageously, the third conduit 11 is thus connected directly to the anode space 4 of the electrolysis cells 2.

Furthermore, the electrolysis modules 40 are each connected via a second conduit 10 to the second gas separation device 21. Water is conveyed through the second conduit 10 back into the electrolysis modules 40. The second conduit 10 can be connected both to the first gas separation device 20 and also to the second gas separation device 21.

Furthermore, the electrolysis unit 1 comprises an apparatus for performing the process engineering 100. The process engineering 100 comprises, in particular, a heat exchanger 50 for cooling the water.

Advantageously, only one first and one second gas separation device 20, 21 are required for all electrolysis modules 40 in order to separate off all product gases in this structure. Furthermore, it is advantageously very easy to increase the number of electrolysis modules 40. In particular, it is also possible to connect an odd number of electrolysis modules 40 to the central gas separation device and subsequently operate them.

Figure 4:
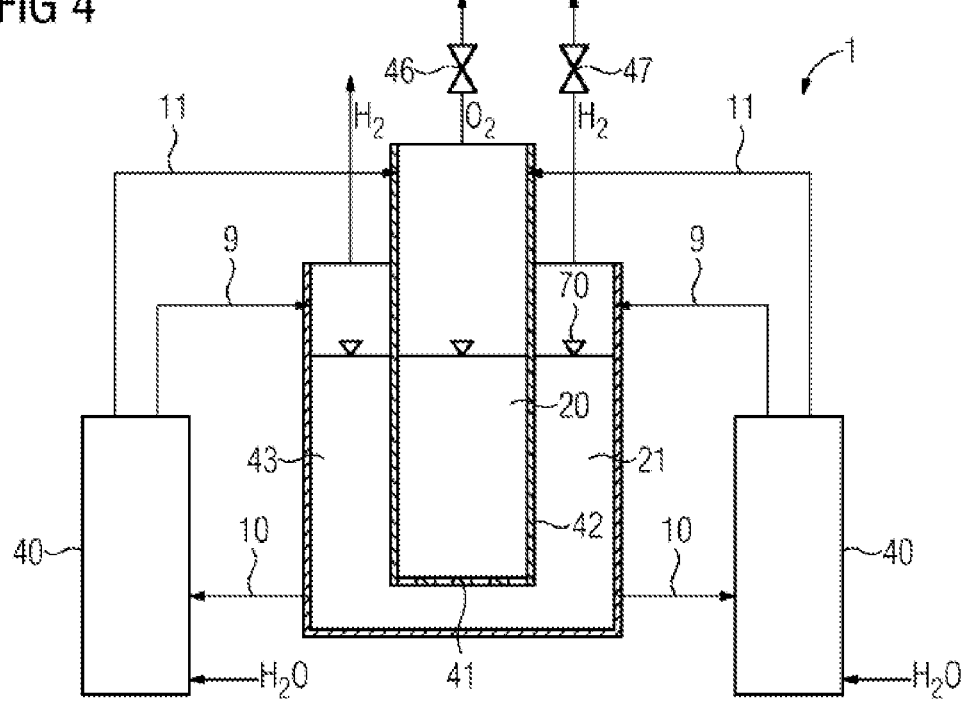
FIG. 4 a sectional view of an electrolysis unit having electrolysis modules and a central gas separation device.

A further advantage of this arrangement can be seen from FIG. 4. FIG. 4 shows a section A-A' through the electrolysis unit 1. This is the same electrolysis unit 1 as depicted in FIG. 3. Accordingly, the central gas separator with the first gas separation device 20 and the second gas separation device 21 is likewise located in the middle of the electrolysis modules 40. In this view, two of the five electrolysis modules 40 can be seen. The central gas separation device and the electrolysis modules 40 are once again connected to one other in each case via a first conduit 9, a second conduit 10 and a third conduit 11. The conduits are in this example arranged at the same height for each electrolysis module 40. Thus, all conduits advantageously have the same length. This identical nature of the parts allows the plant to be constructed more cheaply.

The level 70 of the water in the central gas separation device can also be seen. Furthermore, it can be seen that the first gas separation device 20 has a closing face 41. This closing face 41 is configured as grid in this example. However, it is likewise possible to use meshes or open hole structures or a complete opening over the cross section of the first gas separation device 20.

The first gas separation device 20 and the second gas separation device 21 communicate with one other via the openly configured closing face 41 of the first gas separation device 20. In other words, this means that the level 70 of the water in the two gas separation devices 20, 21 is virtually identical.

Furthermore, it can be seen in FIG. 4 that the level 70 of the water is arranged above the upper edge of the electrolysis modules 40. This is particularly important for safe operation of the electrolysis unit 1. This level 70 ensures that no product gases can be returned via the second conduit 10 into the electrolysis modules 40. Furthermore, the water forms, as a result of the level 70, a lock between the hydrogen-containing, in this example annular, gas space of the second gas separation device 21 and the oxygen-containing, in this example round, gas space. The water thus prevents, as a result of a syphon-like communication between the two gas separation devices, the hydrogen and the oxygen from being mixed with one another or a hydrogen-oxygen reaction being able to take place.

The gas space for the hydrogen particularly advantageously has a volume twice as great as that of the gas space for the oxygen.

Furthermore, a first safety valve 46 and a second safety valve 47 are arranged directly at the outlets for oxygen and hydrogen. It is thus advantageously possible to arrange the pressure maintenance directly at the positions to be secured on the oxygen side and hydrogen side.

In the case of this structure of the central gas separation devices, level equalization for all electrolysis modules 40 is advantageously achieved. No complex arrangements of conduits for each electrolysis module 40 are necessary. This advantageously simplifies the structure of the electrolysis unit 1.

Gas sampling can also be carried out centrally in one of the two gas separation devices 20, 21 and the sample can then be cooled and analyzed centrally. This further simplifies the structure of the electrolysis unit 1. Gas sampling is not shown in the figures.

Figure 5:
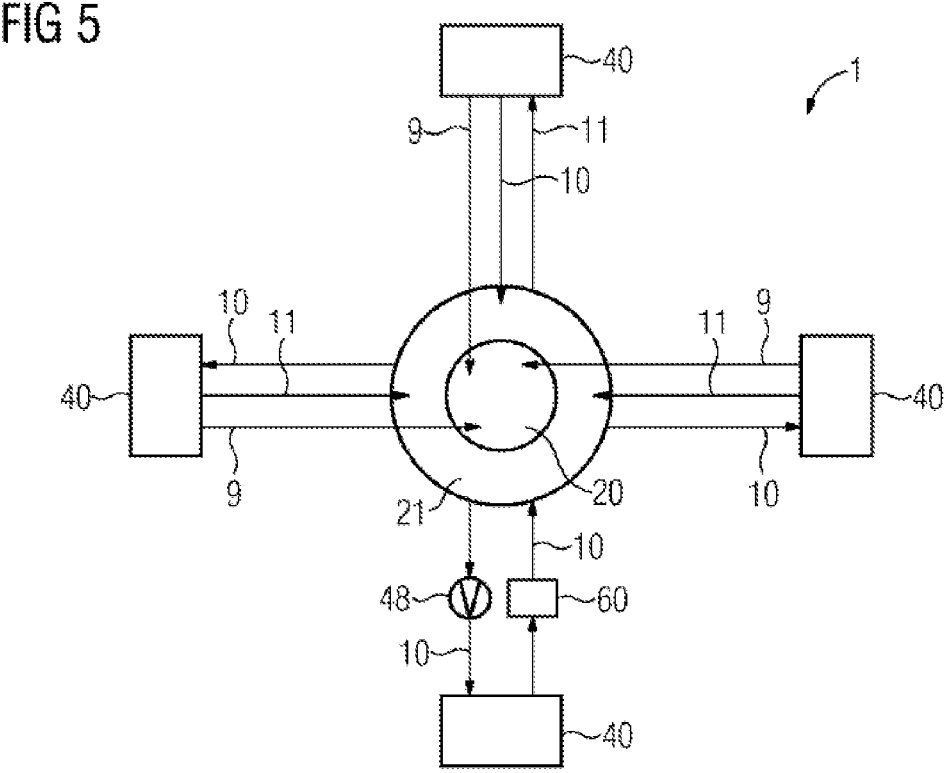
FIG. 5 a plan view of an electrolysis unit having electrolysis modules, a central gas separation device, a heat exchanger and a water treatment device.

FIG. 5 shows an electrolysis unit having a plurality of electrolysis modules 40. The figure shows 3 electrolysis modules 40, but it is likewise possible for at least 4, 5 or 6 electrolysis modules to be arranged around the central gas separation device. In this working example, the second gas separation device 21 is arranged in the middle of the first gas separation device 20. In other words, this means that the first gas separation device 20 is arranged on the outside here. As in the other working examples, the electrolysis modules 40 are each connected via a first conduit 9, a second conduit 10 and a third conduit 11 to the central gas separation device. FIG. 5 also shows a heat exchanger 50 and a water treatment device 60. The heat exchanger 50 is connected via a pump and a second conduit 10 to the first gas separation device 20. Since the first gas separation device 20 communicates with the second gas separation device 21, the water from both gas separation devices is thus transported through this second conduit 10 into the heat exchanger 50. Advantageously, only one heat exchanger 50 is thus required for the total electrolysis unit 1. The type of cooling in the heat exchanger 50 can be chosen freely. It can thus be effected by means of air or water. It is likewise conceivable, depending on the circumstances of the site on which the electrolysis unit is located, to operate an intermediate cooling circuit for a water/glycol mixture using the heat exchanger 50.

Advantageously, only one central pump 48 is required in this example for water exchange in the water treatment device 60. This pump can be adapted individually to the plant conditions. It is conceivable, but not shown in this figure, for the first and second gas separation devices 20, 21 to be positioned on a central support frame. This advantageously makes it possible to arrange a cooling circuit connection underneath the central gas separation device. The one pump 48 of the electrolysis unit 1 is readily accessible as a result.

It is particularly advantageous that the entire thermal mass to be cooled, in particular the water, is arranged centrally between the electrolysis modules 40. As a result, temperature regulation of the process temperature can advantageously be simplified compared to the prior art. In particular, valves in the cooling circuit can be saved, which advantageously leads to cost savings.

After the heat exchanger, the water is fed into a water treatment device 60. The water treatment device is also arranged centrally. Thus, only one device for water treatment is necessary, which constitutes an advantage. Water can advantageously be transported into this water treatment device 60 by means of the same pump 48 used for transport into the heat exchanger 50. Furthermore, the central arrangement of the water treatment device 60 is advantageous since the ion exchangers which are present in the water treatment device 60 are readily accessible. It is also particularly advantageous that the water treatment device can be operated at a low temperature and the ion exchangers can thus advantageously have a longer operating life than in the prior art.

Depending on the process pressure of the electrolysis unit 1, it is likewise possible to provide a second pump for conveying the water through the water treatment device 60.

In all working examples shown in FIGS. 3 to 5, a grating can be arranged between the electrolysis modules 40 and the central gas separation device. This allows ready accessibility of the devices for maintenance purposes.

Figure 6:
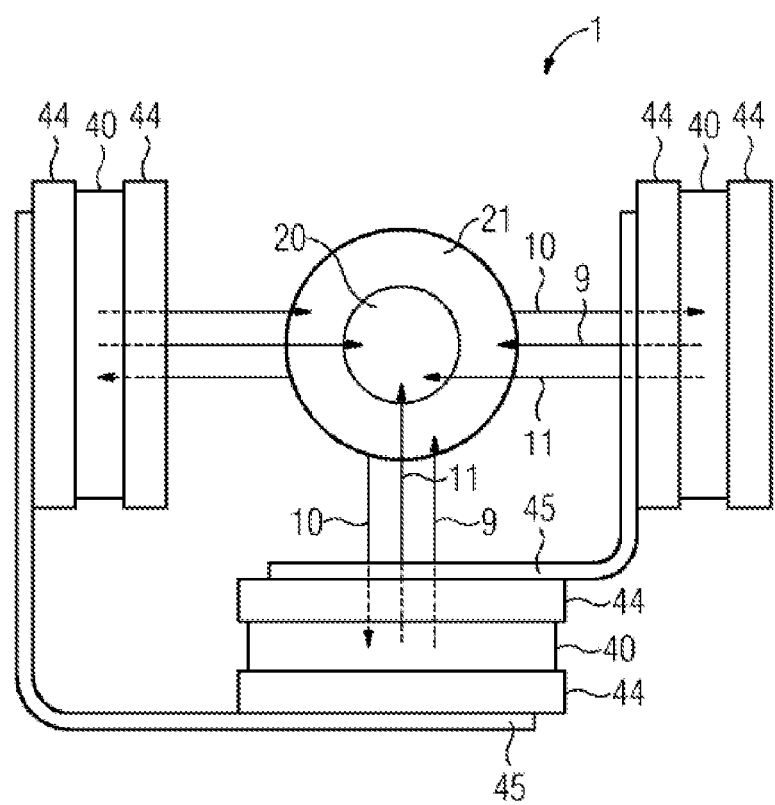
FIG. 6 an electrolysis unit having a central gas separation device and areally contacted electrolysis modules.

The central positioning of the gas separation devices 20, 21 in the middle of the electrolysis modules 40 around the gas separation device allows advantageous contacting of the electrolysis modules 40 with one another. This contacting is shown in FIG. 6. As has been shown in the other examples, a first gas separation device 20 and a second gas separation device 21 surrounding this first gas separation device 20 are arranged in the middle of the electrolysis unit 1. This central gas separation device is surrounded by three electrolysis modules 40. It is likewise possible to conceive of a larger number of electrolysis modules 40 which surround the central gas separation device.

The electrolysis modules 40 each have a module end plate 44 at their two end faces. These module end plates 44 are electrically connected from electrolysis module 40 to electrolysis module 40 via contact plates 45. The contact plates 45 can advantageously be arranged over the entire area of the module end plate 44 or at least large parts of the module end plate 44. This advantageously increases the uniformity of the distribution of current between the electrolysis modules 40. A uniform distribution of current over the electrolysis modules 40 increases the life of the individual electrolysis cells 2 with the proton exchange membrane 3, which constitutes an advantage.

LIST OF REFERENCE SYMBOLS

1 Electrolysis unit
2 Electrolysis cell
3 Proton exchange membrane
4 Anode space
5 Cathode space
6 Heat exchanger
7 Anode
8 Cathode
9 First conduit
10 Second conduit
11 Third conduit
12 Fourth conduit
13 First diameter
14 Second diameter
15 Second riser conduit
16 Connecting conduit
17 Fifth conduit
18 Feed device for water
20 First gas separation device
21 Second gas separation device
30 Bipolar plate of the anode
31 Bipolar plate of the cathode
32 Porous support structure
33 Electrocatalytic layer
40 Electrolysis module
41 Closing face
42 Shell
43 Intermediate space
44 Module end plate
45 Contact plates
46 First safety valve
47 Second safety valve
48 Pump
50 Heat exchanger
60 Water treatment device
70 Level
100 Process engineering
$H_2O$ Water
$H_2$ Hydrogen
$O_2$ Oxygen

The invention claimed is:

1. An electrolysis unit for the electrochemical dissociation of water ($H2O$) into hydrogen ($H2$) and oxygen ($O2$), comprising:
   at least two electrolysis modules;
   exactly one first gas separation device for a first product gas comprising oxygen,
   exactly one second gas separation device for a second product gas comprising hydrogen,
   wherein the first gas separation device is connected to each of the at least two electrolysis modules by means of a first conduit in each case and the second gas separation device is connected to each of the electrolysis modules by means of a second conduit in each case and the at least two first conduits have the same first length and the at least two second conduits have the same second length.

2. The electrolysis unit as claimed in claim 1,
   wherein an electrolysis module of the at least two electrolysis modules comprises at least two electrolysis cells and each electrolysis cell comprises an anode space having an anode and a cathode space having a cathode and the anode space is separated from the cathode space by means of a proton exchange membrane and the anode space is suitable for taking up water (H2O) and oxidizing it at the anode to give a first product comprising oxygen (O2) and the cathode space is suitable for taking up water (H2O) and reducing it at the cathode to give a second product comprising hydrogen (H2).

3. The electrolysis unit as claimed in claim 2,
wherein the cathode space is connected to the second gas separation device and the anode space is connected to the first gas separation device.

4. The electrolysis unit as claimed in claim 1,
wherein the first gas separation device and the second gas separation device are arranged inside one another, with the first or the second gas separation device being configured as an outer shell and a bottom and the other second or first gas separation device projecting as tube into the shell.

5. The electrolysis unit as claimed in claim 4,
wherein the tube has a closing face in the direction of the bottom and the closing face is configured as a grid, as a perforated plate, or as a mesh.

6. The electrolysis unit as claimed in claim 4,
wherein a cross section of the shell and/or of the tube is round or is a polygon.

7. The electrolysis unit as claimed in claim 1,
wherein the first gas separation device is connected to a first pressure maintenance device and the second gas separation device is connected to a second pressure maintenance device.

8. The electrolysis unit as claimed in claim 1,
wherein at least one pump is arranged between the first and/or second gas separation device and the electrolysis modules.

9. The electrolysis unit as claimed in claim 4 comprising:
at least three electrolysis modules,
wherein the electrolysis modules are arranged in a circle and the first and second gas separation devices are arranged centrally in the middle between the modules.

10. The electrolysis unit as claimed in claim 4,
wherein the first and/or second gas separation device is connected to exactly one heat exchanger for cooling the water (H2O) which has been separated off.

11. The electrolysis unit as claimed in claim 4,
wherein the first or second gas separation device is connected to exactly one water treatment device.

12. The electrolysis unit as claimed in claim 11,
wherein the water treatment device comprises a pump, a cooling device, and an ion exchange device.

13. The electrolysis unit as claimed in claim 1,
wherein the electrolysis module comprises a module end plate, which has an exterior covering surface, on each of two opposite sides and a first electrolysis module is electrically connected to a second electrolysis module in such a way that a contacting device contacts a covering surface of the first electrolysis module and a covering surface of the second electrolysis module to a large extent.

14. A method for operating an electrolysis unit comprising:
providing an electrolysis unit comprising at least two electrolysis modules, with water (H2O) being dissociated into hydrogen (H2) and oxygen (O2) in the electrolysis module,
providing only one first gas separation device for a first product gas comprising oxygen,
providing only one second gas separation device for a second product gas comprising hydrogen,
wherein the first gas separation device is connected to each of the at least two electrolysis modules by means of a first conduit in each case and the second gas separation device is connected to each of the electrolysis modules by means of a second conduit in each case and the at least two first conduits comprise a same first length and the at least two second conduits comprise a same second length.

15. The method as claimed in claim 14,
wherein the electrolysis unit is operated at a pressure in the range from 1 bar to 5 bar.

16. The electrolysis unit as claimed in claim 1, wherein the first gas separation device and the second gas separation device are arranged inside one another.

17. The electrolysis unit as claimed in claim 1, further comprising a central gas separation device comprising the first gas separation device and the second gas separation device, wherein a fluid-permeable wall permits fluid communication directly between respective interior volumes of the first gas separation device and the second gas separation device, and wherein the central gas separation device is configured to contain a fluid bath such that when the fluid bath is present the fluid-permeable wall is submerged therein.

18. The electrolysis unit as claimed in claim 1, wherein the central gas separation device is further configured such that when the fluid bath is present:
respective portions of the interior volumes of the first gas separation device and the second gas separation device remain above the fluid bath; and
no direct fluid communication is provided between the respective portions.

* * * * *